(12) United States Patent
Meir

(10) Patent No.: US 9,420,254 B2
(45) Date of Patent: Aug. 16, 2016

(54) PATIENT MONITOR AND METHOD

(71) Applicant: VISION RT LIMITED, London (GB)

(72) Inventor: Ivan Meir, London (GB)

(73) Assignee: VISION RT LIMITED, London (GB)

( * ) Notice: Subject to any disclaimer, the term of this patent is extended or adjusted under 35 U.S.C. 154(b) by 198 days.

(21) Appl. No.: 14/394,704

(22) PCT Filed: Apr. 17, 2013

(86) PCT No.: PCT/GB2013/050976
§ 371 (c)(1),
(2) Date: Oct. 15, 2014

(87) PCT Pub. No.: WO2013/156775
PCT Pub. Date: Oct. 24, 2013

(65) Prior Publication Data
US 2015/0071527 A1  Mar. 12, 2015

(30) Foreign Application Priority Data

Apr. 19, 2012 (GB) .................................. 1206915.9

(51) Int. Cl.
*H04N 13/00* (2006.01)
*G06T 7/00* (2006.01)

(52) U.S. Cl.
CPC .......... *H04N 13/0011* (2013.01); *G06T 7/0046* (2013.01); *G06T 2207/10028* (2013.01); *G06T 2207/10072* (2013.01); *G06T 2207/30196* (2013.01); *G06T 2219/2004* (2013.01); *H04N 2013/0085* (2013.01)

(58) Field of Classification Search
None
See application file for complete search history.

(56) References Cited

U.S. PATENT DOCUMENTS 6,362,820 B1\*  3/2002  Hoppe ................... G06T 17/20
                                                                  345/419
7,348,974 B2   3/2008  Smith et al.
7,889,906 B2   2/2011  Smith et al.
(Continued)

FOREIGN PATENT DOCUMENTS

CN    102365655 A    2/2012
GB    2 355 789 A    5/2001
WO    2010143400 A1  12/2010

OTHER PUBLICATIONS

Mar. 31, 2016 Office Action issued in Chinese Patent Application No. CN201380020931.1.
(Continued)

*Primary Examiner* — Bernard Krasnic
(74) *Attorney, Agent, or Firm* — Kenealy Vaidya LLP

(57) ABSTRACT

A patient monitoring system can include stereoscopic cameras connected to a computer which includes a 3D position determination module operable to process stereoscopic images of a patient to identify 3D positions of a plurality of points on the surface of an imaged patient. A target model store can store a target model including data identifying 3D positions of a set of vertices of a triangulated 3D wire mesh model and connectivity indicative of connections between vertices. A matching module can identify the triangles in a target model surface stored in the target model store closest to points identified by the 3D position determination module and calculate a rigid transformation which minimizes point to plane distances between the identified points and the planes containing the triangles of the target model surface identified as being closest to those points.

18 Claims, 5 Drawing Sheets

(56) References Cited

U.S. PATENT DOCUMENTS

| | | | |
|---|---|---|---|
| 2005/0096515 A1 | 5/2005 | Geng | |
| 2009/0018711 A1 | 1/2009 | Ueda et al. | |
| 2009/0246726 A1* | 10/2009 | Chelnokov | A61C 7/002 433/24 |
| 2010/0151404 A1* | 6/2010 | Wu | A61C 7/00 433/24 |

OTHER PUBLICATIONS

GB Search Report for the related GB Patent Application No. 1206915.9 dated Aug. 17, 2012.

International Search Report for PCT/GB2013/050976 dated Jul. 18, 2013.

Christoph Bert et al.; "A phantom evaluation of a stereo-vision surface imaging system for radiotherapy patient setup"; Medical Physics, vol. 32, No. 9, Aug. 2005; pp. 2753-2762.

Frank B. ter Haar et al.; "Automatic multiview quadruple alignment of unordered range scans"; Shape Modeling and Applications, 2007. SMI 2007. IEEE International Conference on, IEEE, PI, Jun. 1, 2007, pp. 137-146, XP031116741, ISBN: 978-0-7695-2815-1 pp. 137-141.

Yonghuai Liu; "Penalizing Closest Point Sharing for Automatic Free Form Shape Registration"; Transactions on Pattern analysis and Machine intelligence, IEEE, Piscataway, USA, vol. 33, No. 5, May 1, 2011, pp. 1058-1064, XP011373552, ISSN: 0162-8828, DOI:10.1109/TRAMI.2010.207 pp. 1058-1061.

Francois Pomerleau et al.; "Relative Motion Threshold for Rejection in ICP Registration"; Field and Service Robotics—Springer tracts in advanced Robotics, vol. 62, Mar. 1, 2010, pp. 229-238, XP002699721, Section 2.

Andrei Sharf et al.; "Context-based surface completion"; ACM Transactions on Graphics, vol. 23, No. 3, Aug. 1, 2004, p. 878, XP055051963, ISSN:0730-0301, DOI:10.1145/1015706.1015814 Section 7.

S. M. Yamany et al.; "Novel surface registration using the grid closest point (GCP)transform"; Image Processing, 1998. ICIP 98. Proceedings.1998 International Conference on Chicago, IL, USA Oct. 4-7, 1998, Los Alamitos, CA, USA, IEEE Comput. Soc, US, vol. 3, Oct. 4, 1998, pp. 809-813, XP010586935, DOI: 10.1109/ICIP.1998. 999069; ISBN: 978-0-8186-8821-8 Section 2.

Per Bergstram et al.; "Repeated surface registration for on-line use"; The International Journal of Advanced Manufacturing Technology, Springer, Berlin, DE, vol. 54, No. 5-8, Oct. 1, 2010, pp. 677-689, XP019897957, ISSN: 1433-3015, DOI: 10.1007/S00170-010-2950-6, Sections 1-3.

Szymon Rusinkiewicz et al.; "Efficient variants of the ICP algorithm"; 3_D Digital Imaging and Modeling, 2001. Proceedings. Third International AL Conference on May 28-Jun. 1, 2001, Piscataway, NJ, USA, May 28, 2001, pp. 145-152, XP010542858, ISBN:978-0-7695-0984-6 the whole document.

International Preliminary Report on Patentability and Written Opinion of the International Searching Authority for PCT/GB2013/050976, Oct. 21, 2014.

* cited by examiner

PATIENT MONITOR AND METHOD

This application is a national phase filing under 35 C.F.R. §371 of and claims priority to PCT Patent Application No. PCT/GB2013/050976, filed on Apr. 17, 2013, which claims the priority benefit under 35 U.S.C. §119 of British Patent Application No. 1206915.9, filed on Apr. 19, 2012, which are hereby incorporated in their entireties by reference.

The present invention relates to patient monitoring. More particularly, embodiments of the present invention relate to monitoring the positioning of patients and also to enable the movement of patients to be detected. The invention is particularly suitable for use with radio therapy devices and computed tomography (CT) scanners and the like where accurate positioning and the detection of patient movement is important for successful treatment.

Radiotherapy consists of projecting onto a predetermined region of a patient's body, a radiation beam so as to destroy or eliminate tumors existing therein. Such treatment is usually carried out periodically and repeatedly. At each medical intervention, the radiation source must be positioned with respect to the patient in order to irradiate the selected region with the highest possible accuracy to avoid radiating adjacent tissue on which radiation beams would be harmful.

When applying radiation to a patient, the gating of treatment apparatus should be matched with the breathing cycle so that radiation is focused on the location of a tumor and collateral damage to other tissues is minimized. If movement of a patient is detected the treatment should be halted to avoid irradiating areas of a patient other than a tumor location.

For this reason a number of monitoring systems for assisting the positioning of patients during radiotherapy have therefore been proposed such as those described in Vision RT's earlier patents and patent applications U.S. Pat. No. 7,348,974, U.S. Pat. No. 7,889,906 and US2009-018711 all of which are hereby incorporated by reference.

In the systems described in Vision RT's patents and patent applications, stereoscopic images of a patient are obtained and processed to generate data identifying 3D positions of a large number of points corresponding to points on the surface of an imaged patient. Such data can be compared with data generated on a previous occasion and used to position a patient in a consistent manner or provide a warning when a patient moves out of position. Typically such a comparison involves undertaking Procrustes analysis to determine a transformation which minimizes the differences in position between points on the surface of a patient identified by data generated based on live images and points on the surface of a patient identified by data generated on a previous occasion.

Determining an accurate match between a current patient position and the position of a patient earlier in treatment is difficult.

One particular problem is that there is no guarantee that exactly the same portion of a patient will be imaged on two different occasions. This means that, whereas obtained data may identify the 3D co-ordinates of points on the surface of a patient, it is not the case that the points identified in one model correspond to points represented by data in a previously generated model. Thus trying to determine a transformation to minimise the average distance between points in data obtained on different occasions may not accurately reflect how the position of a patient has changed.

Further, in use portions of a treatment apparatus may obscure the view of a stereoscopic camera so that data for only part of a surface of a patient may be generated. This can mean that there is only a limited area of overlap between an imaged surface and the surface used to generate target data.

In addition to attempting to identify an accurate match between two surfaces, it is also desirable to determine such a match rapidly. Given the large numbers of data points in a typical model surface, sometimes a subset of the points is selected and used to calculate an initial match. Typically such points are selected so that they are spread across the surface of a model. However, if only a subset of the points is used to determine a match between two surfaces, the accuracy of a match may be poor if only a relatively small number of points used to determine a match corresponding to areas of overlap between a current and a target model.

An alternative system which enables matches to be identified both rapidly and accurately is desirable.

In accordance with one aspect of the present invention there is provided a computer implemented method of determining a rigid transformation for matching the position of an object with the position of a target object represented by a target model comprising data identifying 3D positions of a set of vertices of a triangulated 3D wire mesh and connectivity indicative of connections between vertices, the method comprising: obtaining stereoscopic images of an object; utilizing a computer to process the stereoscopic images to identify 3D positions of a plurality of points on the surface of the imaged object; utilizing the computer to select a set of the identified 3D positions on the surface of an imaged object as points to be utilized to determine a rigid transformation for matching the position of an object with the position of a target object on the basis of the determined distances between the identified 3D positions and vertices of the target model identified as being closest to said positions; and utilizing the computer to calculate a rigid transformation which minimizes point to plane distances between the identified set of 3D positions and the planes containing the triangles of the target model surface identified as being closest to those points.

In some embodiments selecting a set of the identified 3D positions on the surface of an imaged object and calculating a rigid transformation which minimizes point to plane distances between the identified set of 3D positions and the planes containing the triangles of the target model surface identified as being closest to those points may comprise for a number of iterations: determining threshold values to be utilized for a current iteration; selecting a set of the identified 3D positions on the surface of an imaged object as points to be utilized to determine a rigid transformation for matching the position of an object with the position of a target object on the basis of a comparison of the distances between the identified 3D positions and vertices of the target model identified as being closest to said positions with the threshold; calculating a rigid transformation which minimizes point to plane distances between the identified set of 3D positions and the planes containing the triangles of the target model surface identified as being closest to those points; wherein the rigid transformation for matching the position of an object with the position of a target object comprises the sum of the transformations determined at each iteration.

In such embodiments an initial threshold value for a first iteration may be set and threshold values for subsequent iterations may be determined on the basis of the average distances between the identified 3D positions and vertices of the target model identified as being closest to said positions.

The set of 3D positions on the surface of an imaged object utilized to determine a rigid transformation for matching the position of an object with the position of a target object may be selected on the basis of the relative orientation of the object at a point and the orientation of a triangle in the target model surface identified as being closest to that point.

Further the selected set may be filtered to remove any points determined to project to the same location prior to calculating a rigid transformation which minimizes point to plane distances between the filtered identified set of 3D positions and the planes containing the triangles of the target model surface identified as being closest to those points.

In some embodiments calculating a rigid transformation which minimizes point to plane distances between the identified points on the surface of an imaged object and the planes containing the triangles of the target model surface identified as being closest to those points may comprise determining for each of said points, the projections of said points to the planes containing the triangles of the target model surface identified as being closest to those points; determining a translation which aligns the centroids of the points identified as being locations on the surface of an object with the projections of said points to identified planes containing the triangles of the target model surface identified as being closest to those points; and determining a rotation which minimizes point to plane distances between the identified points on the surface of an imaged object and the planes containing the triangles of the target model surface identified as being closest to those points after the determined translation has been applied.

Identification of triangles in the target model surface closest to 3D positions of the points on the surface of an imaged object may comprise generating an array, identifying for a regular grid of points in 3D space, the vertices of the target model closest to those points; identifying the portions of the regular 3D grid closest to points on the surface of an imaged object; and utilizing the vertices associated with the identified portions of the 3D grid by the array to identify the triangle in the target model surface closest to said points.

In such embodiments utilizing the vertices associated with the identified portions of the 3D grid by the array to identify the triangle in the target model surface closest to a point may comprise: determining of the vertices associated with the identified portions of the 3D grid, the vertex of the model surface closest to the point on the surface of the object currently being processed; determining if any of the vertices directly connected to the determined closest vertex is closer to the 3D position of the point on the surface of an imaged object currently being processed; if any of the directly connected vertices is determined to be closer to the 3D position of the point on the surface of an imaged object currently being processed, identifying whether any vertices connected to that vertex is closer to the 3D position of the point on the surface of an imaged object currently being processed; and when it is determined that none of the directly connected vertices is determined to be closer to the 3D position of the point on the surface of an imaged object currently being processed, determining for each triangle in the target model containing the closest identified vertex, the distance between a plane containing the triangle and the 3D position of the point on the surface of an imaged object to identify the triangle in the target surface closest to the point on the surface of the object currently being processed.

A suitable array may be generated by: using, for each vertex in a target model, the 3D co-ordinates associated with a vertex of a target model to identify a portion of a regular 3D grid closest to the location of the vertex; determining the distance between the vertex and the positions corresponding to points in the identified portion of a regular 3D grid; and determining whether said identified points are associated with data indicative of the points being closer to another vertex in the target model and if not associating said points with data identifying the vertex and the distance between the vertex and said points. The portions of a regular grid not associated with data identifying vertices can then be associated with data by traversing the regular 3D grid in each of the directions corresponding to the axes of the regular 3D grid and determining when traversing the grid, whether a vertex associated with a neighbouring point on the grid in the direction of traversal is closer to the position associated with the current grid point than any vertex previously associated with that grid point and if so associating the grid point with data identifying the vertex associated with the neighbouring grid point.

In a further aspect there is provided a patient monitoring system comprising: a 3D position determination module operable to process stereoscopic images of a patient to identify 3D positions of a plurality of points on the surface of an imaged patient; a target model store operable to store a target model comprising data identifying 3D positions of a set of vertices of a triangulated 3D wire mesh model and connectivity indicative of connections between vertices; and a matching module operable to identify the triangles in a target model surface stored in the target model store closest to points identified by the 3D position determination module and calculate a rigid transformation which minimizes point to plane distances between a selected set of the identified points and the planes containing the triangles of the target model surface identified as being closest to those points wherein the selected set of points utilized to determine the rigid transformation is selected on the basis of the determined distances between the identified 3D positions and vertices of the target model identified as being closest to said positions.

Such a patient monitoring system may additionally comprise a stereoscopic camera operable to obtain stereoscopic images of a patient, wherein the 3D position determination module is arranged to process stereoscopic images obtained by the stereoscopic camera.

The system may also comprise a mechanical couch, wherein the stereoscopic camera is operable to obtain stereoscopic images of a patient on the couch and the matching module is operable to generate instructions to cause the mechanical couch to align an imaged patient on the basis of a calculated rigid transformation which minimizes point to plane distances between the identified points on the surface of an imaged patient and the planes containing the triangles of the target model surface identified as being closest to those points.

Further the system may also comprise a treatment apparatus arranged to be inhibited from operating if the matching module determines that a calculated rigid transformation which minimizes point to plane distances between the identified points on the surface of an imaged patient and the planes containing the triangles of the target model surface identified as being closest to those points is indicative of a patient being out of position by more than a threshold amount.

Embodiments of the present invention will now be described with reference to the accompanying drawings in which.

Figure 1:
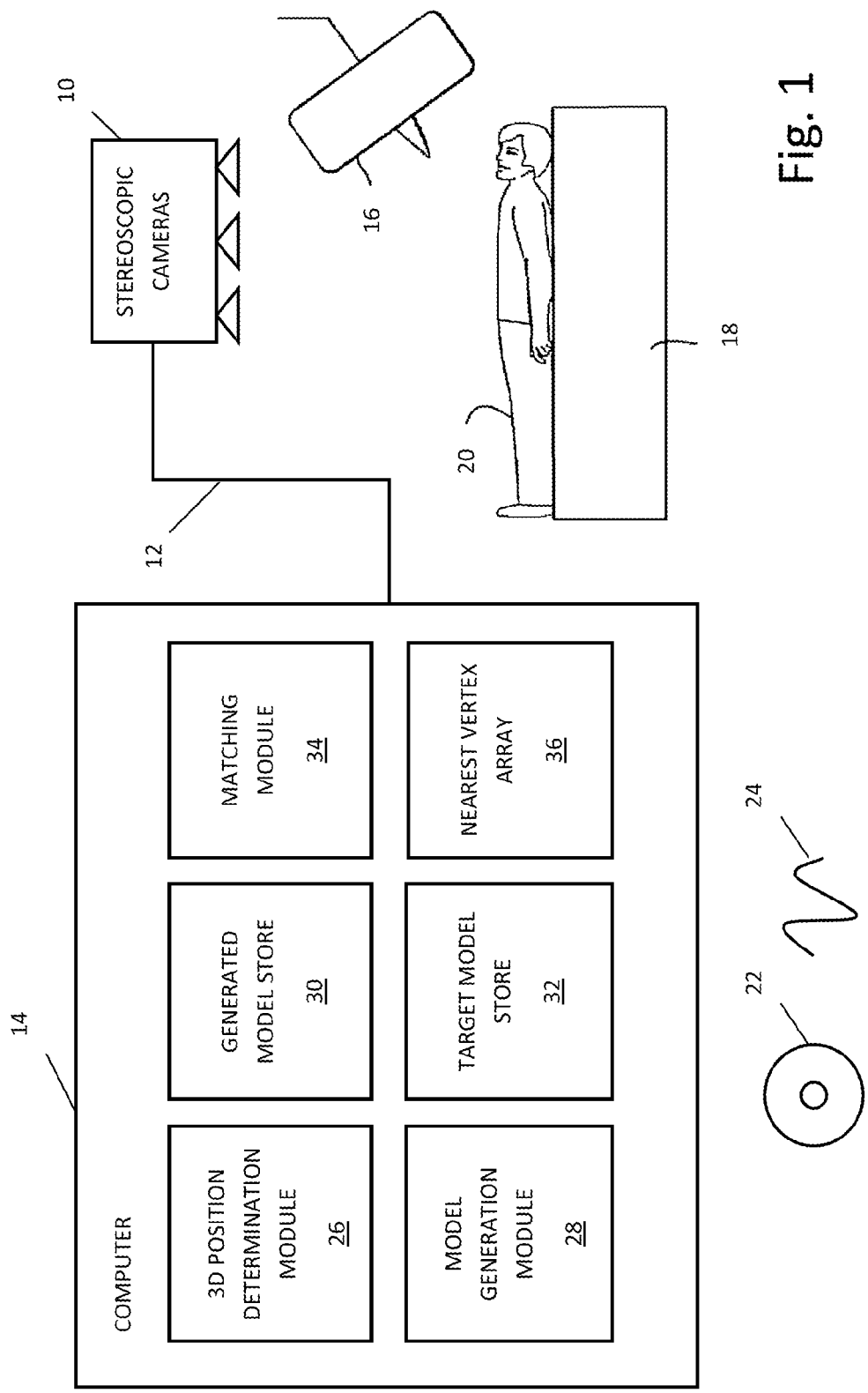
FIG. 1 is a schematic diagram of a patient monitor in accordance with an embodiment of the present invention.
Figure 3:
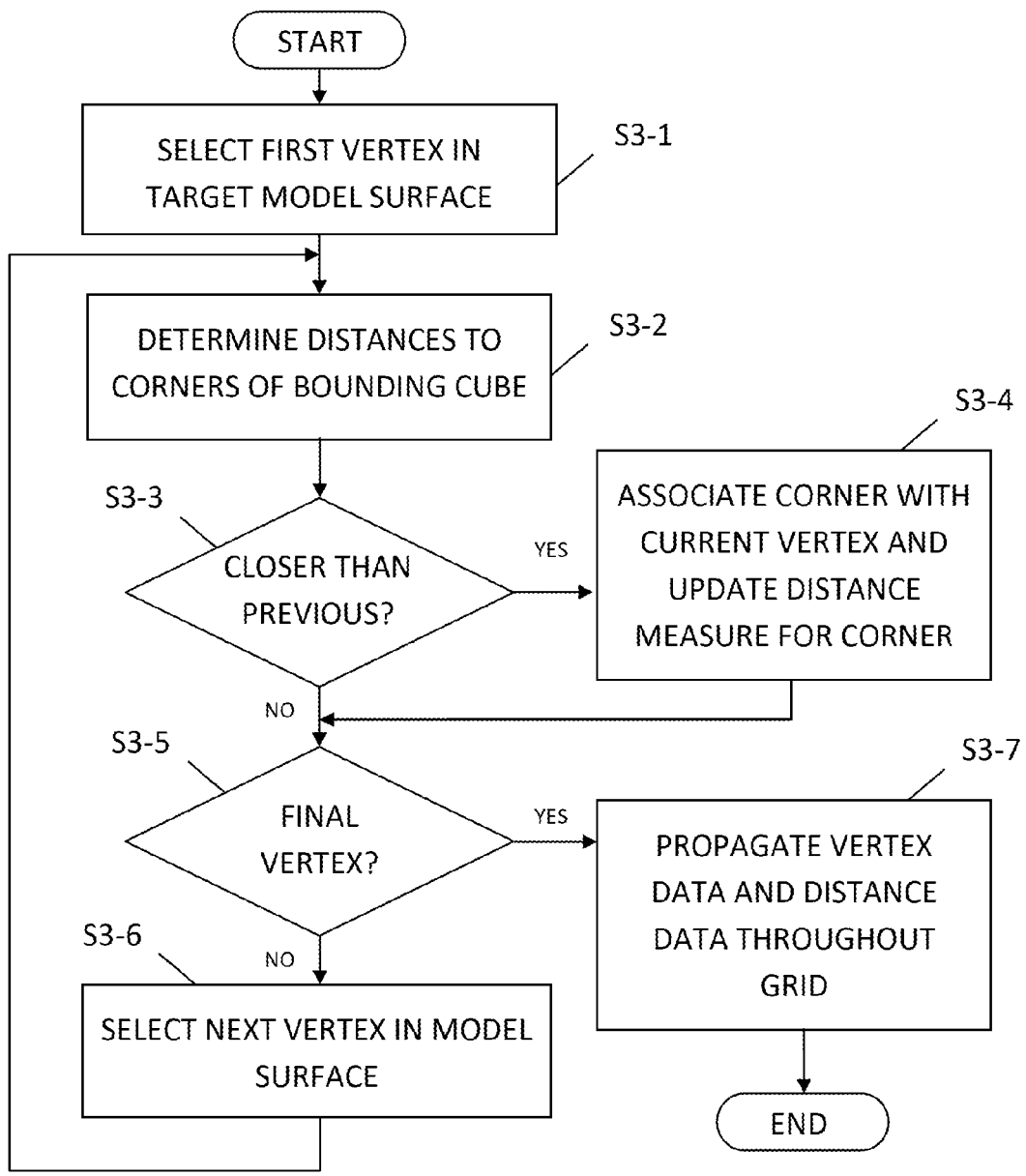
FIG. 3 is a flow diagram for the processing of the monitor of FIG. 1 to populate an array identifying nearest vertices.
Figure 4A:
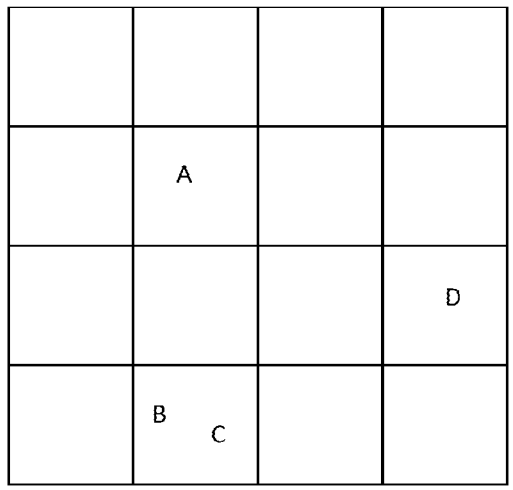
Figure 4B:
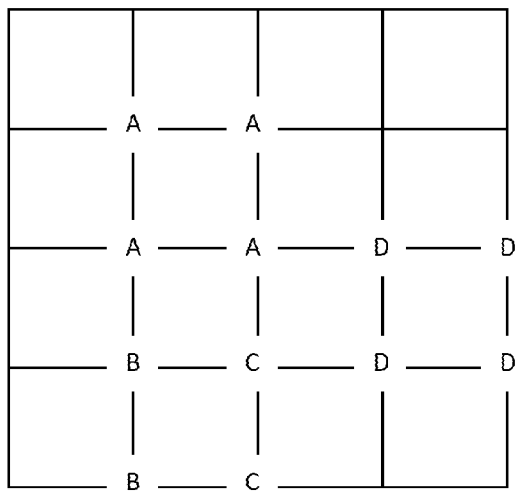
Figure 4C:
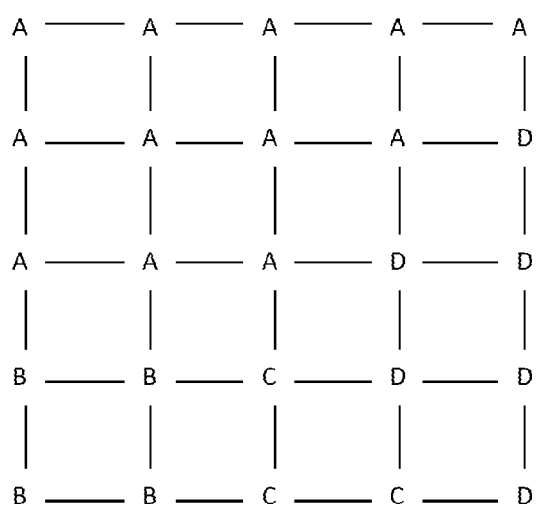
Figure 5:
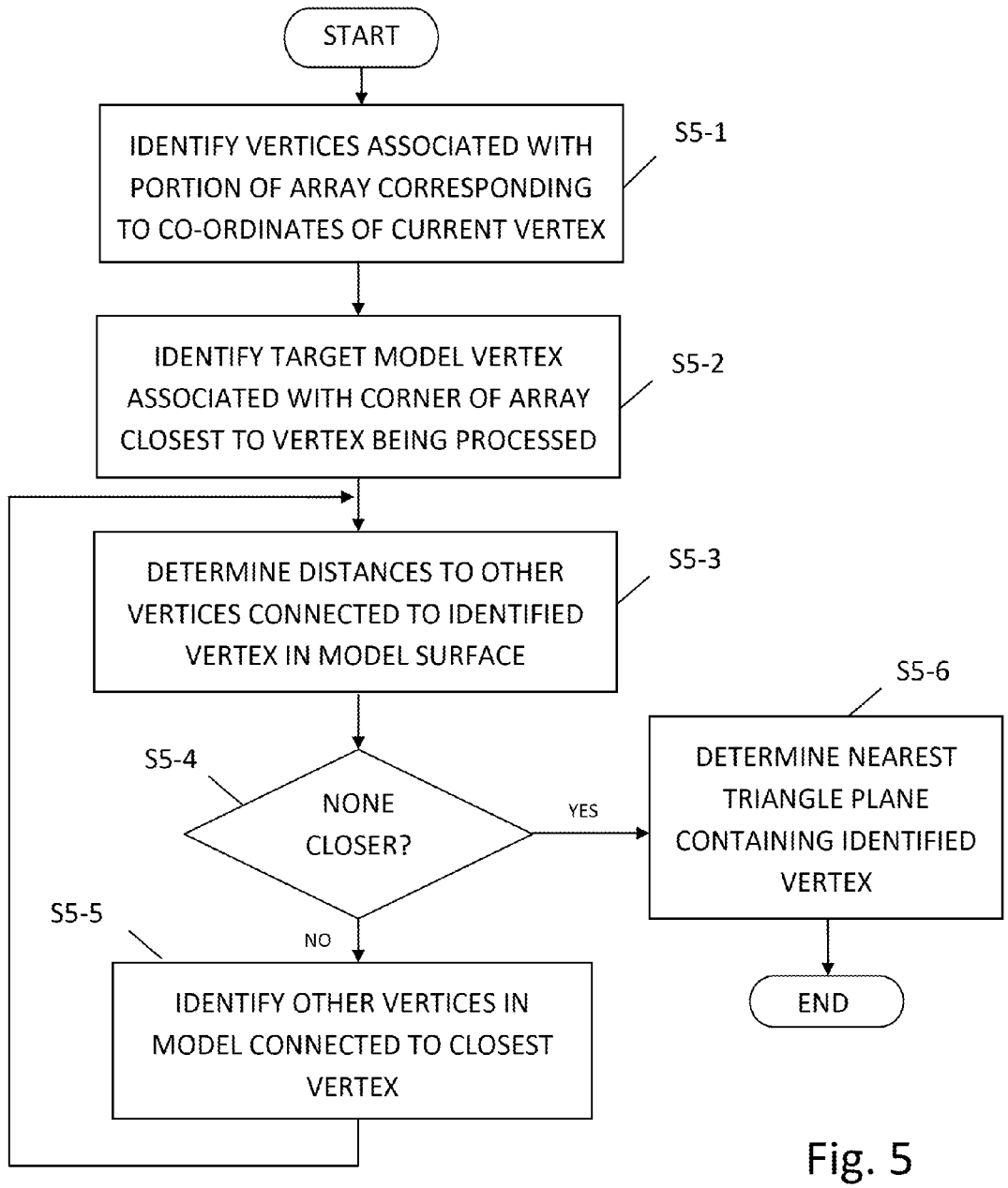

FIGS. 4A-C are schematic illustrations of the processing of FIG. 3 to a portion of an array; and FIG. 5 is a flow diagram of the processing of the monitor of FIG. 1 to identify the nearest triangle plane in a model surface to a point on another surface.

FIG. 1 is a schematic diagram of a patient monitor in accordance with an embodiment of the present invention. In accordance with this embodiment, there is provided set of stereoscopic cameras 10 that are connected by wiring 12 to a computer 14. The computer 14 is also connected to treatment apparatus 16 such as a linear accelerator for applying radiotherapy or an x-ray simulator for planning radiotherapy. A mechanical couch 18 is provided as part of the treatment apparatus upon which a patient 20 lies during treatment. The treatment apparatus 16 and the mechanical couch 18 are arranged such that under the control of the computer 14 the relative positions of the mechanical couch 18 and the treatment apparatus 16 may be varied, laterally, vertically, longitudinally and rotationally.

In use, the stereoscopic cameras 10 obtain video images of a patient 20 lying on the mechanical couch 18. These video images are passed via the wiring 12 to the computer 14. The computer 14 then processes the images of the patient 20 to generate a model of the surface of the patient. This model is compared with a model of the patient generated during earlier treatment sessions. When positioning a patient the difference between a current model surface and a target model surface obtained from an earlier session is identified and the positioning instructions necessary to align the surfaces determined and sent to the mechanical couch 18. Subsequently during treatment any deviation from an initial set up can be identified and if the deviation is greater than a threshold, the computer 14 sends instructions to the treatment apparatus 16 to cause treatment to be halted until a patient 20 can be repositioned.

In order for the computer 14 to process images received from the stereoscopic cameras 10, the computer 14 is configured by software either provided on a disk 22 or by receiving an electrical signal 24 via a communications network into a number of functional modules 26-36. It will be appreciated that the functional modules 26-36 illustrated in FIG. 1 are purely notional in order to assist with the understanding of the working of the claimed invention and may not in certain embodiments directly correspond with blocks of code in the source code for the software. In other embodiments the functions performed by the illustrated functional modules 26-36 may be divided between different modules or may be performed by the re-use of the same modules for different functions.

In this embodiment, the functional modules 26-36 comprise: a 3D position determination module 26 for processing images received from the stereoscopic cameras 10, a model generation module 28 for processing data generated by the 3D position determination module 26 and converting the data into a 3D wire mesh model of an imaged computer surface; a generated model store 30 for storing a 3D wire mesh model of an imaged surface; a target model store 32 for storing a previously generated 3D wire mesh model; a matching module 34 for determining rotations and translations required to match a generated model with a target model; and an nearest vertex array 36.

In use, as images are obtained by the stereoscopic cameras 10, these images are processed by the 3D position determination module 26. This processing enables the 3D position determination module to identify 3D positions of corresponding points in pairs of images. The position data generated by the 3D position determination module 26 is then passed to the model generation module 28 which processes the position data to generate a 3D wire mesh model of the surface of a patient 20 imaged by the stereoscopic cameras 10. In this embodiment the 3D model comprises a triangulated wire mesh model where the vertices of the model correspond to the 3D positions determined by the 3D position determination module 26. When such a model has been determined it is stored in the generated model store 30.

When a wire mesh model of the surface of a patient 20 has been stored, the matching module 34 is then invoked to determine a matching translation and rotation between the generated model based on the current images being obtained by the stereoscopic cameras 10 and a previously generated model surface of the patient stored in the target model store 32. As will be explained, the matching module 34 determines such a matching utilising the nearest vertex array 36 in a manner which enables a match to be rapidly determined and which enables a highly accurate match to be determined.

The determined translation and rotation can then be sent as instructions to the mechanical couch 18 to cause the couch to position the patient 20 in the same position relative to the treatment apparatus 16 as they were when they were previously treated. Subsequently, the stereoscopic cameras 10 can continue to monitor the patient 20 and any variation in position can be identified by generating further model surfaces and comparing those generated surfaces with the target model stored in the target model store 32. If it is determined that a patient has moved out of position, the treatment apparatus 16 can be halted and the patient 20 repositioned, thereby avoiding irradiating the wrong parts of the patient 20.

The processing undertaken by the matching module 34 will now be described in detail with reference to FIGS. 2-5.

Figure 2:
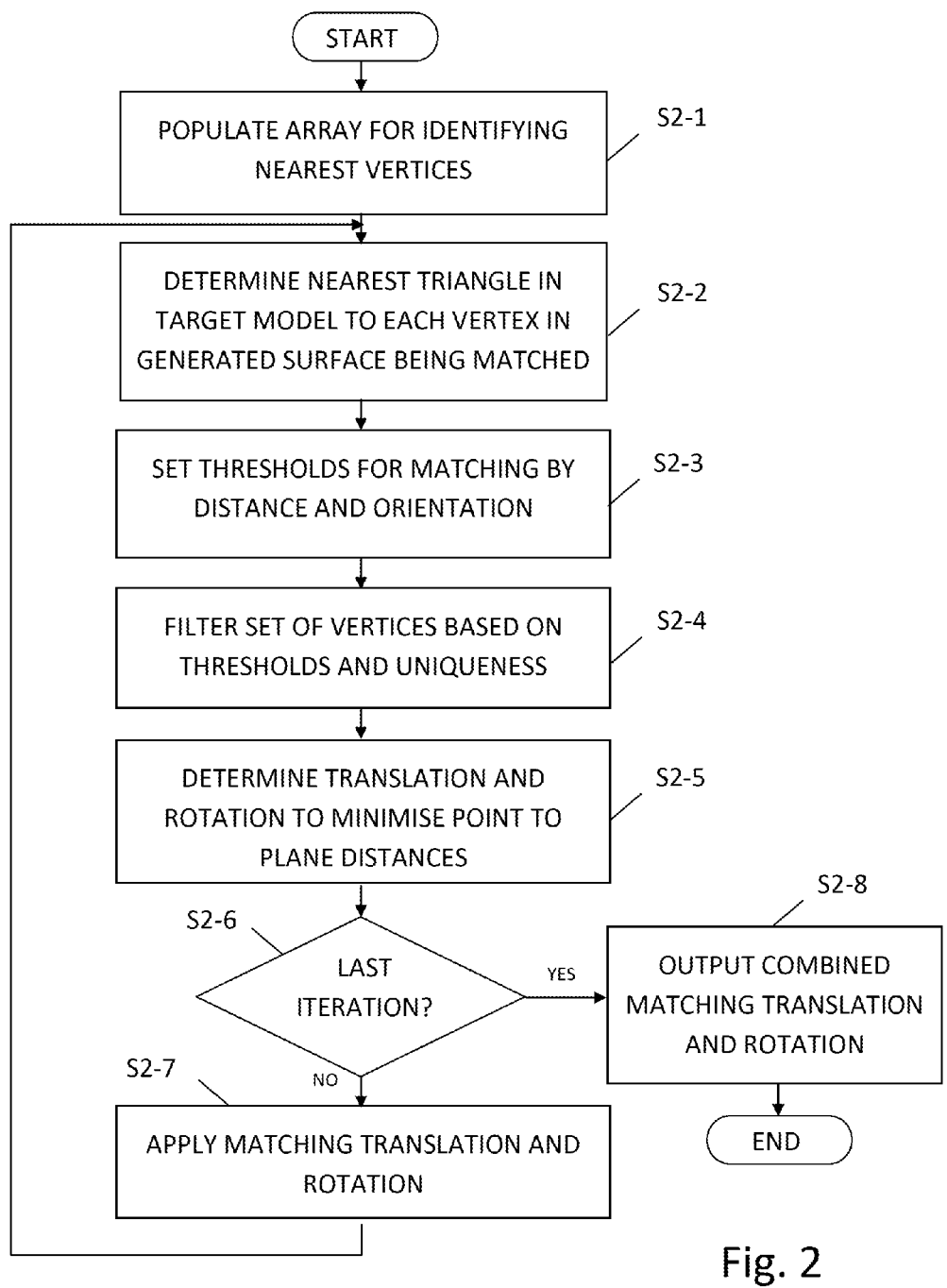
FIG. 2 is a flow diagram of the processing of the patient monitor of FIG. 1 to determine a matching translation and rotation for matching two model surfaces.

Turning, first to FIG. 2 which is a flow diagram of the processing undertaken by the matching module 34, when the matching module 34 is first invoked, initially (s2-1) the matching module 34 utilizes the data stored in the target model store 32 to populate the nearest vertex array 36 to enable the matching module 34 to identify the closest vertices in 3D space of a stored model to other points in space in an efficient manner.

When attempting to determine a matching transformation to match a generated model surface with a target model surface, it is frequently necessary to be able to identify the closest vertex or triangle in a target model to the position identified by data generated based on processing a current image. Frequently such a determination needs to be made for each point in a generated model surface multiple times whilst an iterative transformation is calculated. Conventionally identifying a closest vertex would involve determining the distance between a current point and all the vertices represented in a model. Where both a currently generated model and a target model have N vertices, this involves $N^2$ calculations which may have to be determined at each iteration.

In contrast, in accordance with the present application, processing is undertaken to identify the closest vertex in a target model to a grid of positions and this data is stored in the nearest vertex array 36. Subsequently the nearest vertex array is utilized to identify a small number of vertices in a target model which may be the closest vertices to a particular point in space. This then reduces the volume of processing models with N points from the order of $N^2$ to the order of N.

The processing undertaken by the matching module 34 to populate the nearest vertex array 36 will now be described with reference with to FIGS. 3 and 4A-C.

Turning to FIG. 3 which is a flow diagram of the processing undertaken by the matching module 34, initially (s3-1) the matching module 34 selects a first vertex from the target model stored in the target model store 32.

The matching module 34, then (s3-2) proceeds to utilize the geometry data identifying the position in 3D space of the currently selected vertex to identify the portion of the nearest vertex array corresponding to that area and to determine distance values identifying the distances between the position of the selected vertex and positions corresponding to the corners of a cube in a 3 dimensional grid containing that position.

More specifically, in this embodiment the nearest vertex array 36 comprises a data store for storing data associated with a 3 dimensional array where each of the entries in the array is associated with a point on a regular 3D grid in space. When processing a vertex in a stored model, the geometry data of the vertex is used to identify the eight entries in the vertex array 36 corresponding to the closest point in the array to that vertex.

Thus for example, assuming that a vertex was associated with position data identifying a position with co-ordinates $(x+\delta x, y+\delta y, z+\delta z)$, the matching module 34 would identify the closest points on the grid represented by the nearest vertex array 36 as being the points associated with the positions $(x,y,z)$, $(x+1,y,z)$, $(x,y+1,z)$, $(x+1,y+1,z)$ $(x,y,z+1)$, $(x+1,y,z+1)$, $(x,y+1,z+1)$, and $(x+1,y+1,z+1)$.

The matching module 34 then proceeds to determine the Euclidian distance between the position identified by the geometry data of the vertex being processed and each of these positions and then (s3-3) determines whether those identified positions in the nearest vertex array 36 are associated with data identifying a vertex distance greater than those determined distances.

If the matching module 34 determines that the current distance data associated with an entry in the vertex array is greater than the Euclidian distance between the position represented by the entry in the array and the vertex being processed or if the matching module 34 determines that no data is currently associated with an identified portion of the vertex array 36, the matching module then proceeds to store in that portion of the nearest vertex array 36 data identifying the current vertex and the distance between that vertex and the position associated with that entry in the array.

Thus for example if vertex A was associated with co-ordinates $(x+\delta x, y+\delta y, z+\delta z)$, when determining data to be stored in the nearest vertex array 36 for the position $(x, y, z)$, initially the Euclidian distance between the vertex and position $(x, y, z)$ would be determined which in this example would be $(\delta x^2+\delta y^2+\delta z^2)^{1/2}$. If this distance was less than the current distance associated with point $(x, y, z)$ or no data was associated with this point, data identifying vertex A and the calculated distance would be stored.

When the matching module 34 has checked all eight of the entries in the nearest vertex array 36 associated with the 8 closest points in the array to the vertex being processed and updated the data associated with those points as necessary, the matching module 34 then determines (s3-5) whether all of the vertices of the target model have been processed. If this is not the case, the next vertex in the target model is selected (s3-6) and data in the nearest vertex array 36 is then updated (s3-2-s3-4) before the matching module 34 checks once again whether all the vertices in the target model have been processed.

FIG. 4 is a schematic illustration of the processing undertaken by the matching module 34 for part of a nearest vertex array 36.

In the example of FIG. 4A points A-D of an exemplary vertex are shown in positions relative to a grid where the intersections of grid lines correspond to positions associated with data in the nearest vertex array 36. In the illustration of FIG. 4, only a two dimensional array is illustrated whereas in an actual embodiment data would be stored in a three dimensional array.

When processing vertex A, the co-ordinate data for vertex A would enable the square containing A to be identified and the corners of that square would then be associated with data identifying vector A and the distance between the corner and the actual position of vertex A. Similarly when processing vertex B, the square containing vertex B would be identified and the portions of the array associated with the corners of that square would be updated to identify vertex B. When processing vertex C the same points in the array would then be identified as both B and C lie within the same square. The corners of the array corresponding to the square which were closer to vertex C than vertex B would then be updated to become associated with vertex C rather than vertex B.

The state of the array when vertices A,B,C and D have been processed is shown in FIG. 4B. At this stage each of the intersections associated with a letter would be associated with data identifying a vertex (shown as a letters A-D in the Figure) and distance data identifying the distance between the position represented by the array entry and the position of the vertex identified by the letter.

Returning to FIG. 3, having processed all of the vertices in a target model and generated a sparsely populated array such as is shown in FIG. 4B, the matching module 34 then (s3-7) proceeds to propagate vertex and distance data throughout the grid.

More specifically, starting at the bottom left hand corner of the array, each entry in the array is considered in turn. In the initial pass the entries are processed from left to right. The array is scanned until the first entry associated with vertex and distance data is identified. For each subsequent position in the array, if no vertex data is associated with a position in the array data identifying the most recently identified closest vertex and distance data identifying the distance between that vertex and the currently identified point is stored. If a point in the array is already associated with vertex data, a determination is made as to whether the vertex associated with the portion of the array being processed is closest to that point or whether the most recently identified vertex is closest and that point in the array is associated with data identifying the closer vertex and the distance to that vertex.

Thus for example in the case of the array shown in FIG. 4B, starting at the bottom left of the array, moving left to right, at the bottom of the array the first entry of the array to be encountered would be the entry at the bottom of the array associated with vertex B. Moving further to the right the next entry is associated with vertex C. In this case a check would be made whether vertex B or vertex C was closest to the position identified by that entry in the grid. Having determined that vertex C was closest subsequent entries in the array moving to the right would be updated to be associated with vertex C until a closer entry was identified.

Having updated the array moving left to right, the same processing is then repeated moving from right to left, from top to bottom, bottom to top and from front to back and from back to front.

FIG. 4C is a schematic illustration of the portion of the array of FIG. 4B after nearest vertex data has been propagated throughout the entire array. As can be seen in FIG. 4C after processing every point in the nearest vertex array 36 is associated with data identifying a nearest vertex. The way in which the vertex array is populated is such to ensure that the vertex data identifies the vertex of the target model closest to the point in space associated with the vertex. As the points identified in the vertex array are points on a regular grid the points in an array closest to any position in space can be rapidly determined from co-ordinate data.

Returning to FIG. 2, having populated the nearest vertex array 36, the array can then be utilised to assist with identify portions of a generated model surface corresponding to portions of the target model in the target model store 32.

In this embodiment, initially all vertices in a generated model stored in the generated model store 30 are considered as being suitable for being matched to part of the target model.

The nearest triangle in the target model to each of the vertices in the generated model currently being considered for matching is then (s2-2) determined. This is determined for each vertex in the generated model in turn.

Turning to FIG. 5, which is a flow diagram of the processing of the matching module 34 to identify the closest triangle in a target model to a vertex in a generated model, initially (s5-1) a seed for identifying the portion of the target model closest to the position of the current vertex is identified by using the nearest vertex array 36 as a look up table based on the co-ordinates of the vertex being processed.

Thus for example when processing when processing a vertex in the generated model associated with co-ordinate data (x+δx, y+δy, z+δz), the matching module 34 would use the vertex data in the nearest vertex array 36 to identify the vertices associated with the positions (x,y,z), (x+1,y,z), (x,y+1,z), (x+1,y+1,z) (x,y,z+1), (x+1,y,z+1), (x,y+1,z+1), and (x+1,y+1,z+1) in the nearest vertex array 34.

The matching module 34 would then (s5-2) identify a single seed point for identifying the closest triangle in the target model by determining which of the vertices identified by vertex data in the portion of the nearest vertex array 36 accesses was closest to the position of the vertex currently being processed. Thus having identified up to eight vertices as candidate seed points by accessing the nearest vertex array 36, the distance between the position of the vertex currently being processed and the candidate vertex is determined and the vertex in the target model determined to be closest in space to the position of the vertex being process is identified.

The matching module 34 then (s5-3) utilizes the connectivity data of the model stored in the target model store 32 to identify vertices in the target model which are connected to the identified closest seed vertex and calculates for each of the vertices the Euclidian distance between the positions of the identified vertices in the target model and the position associated with the vertex of the currently generated model currently being processed.

If the matching module 34 determines (s5-4) that any of the vertices connected to the current seed vertex is closer in space to the position of the vertex in the currently generated model being processed, the vertex identified as being closest to the position of the vertex in the generated model currently being processed is set to be the seed vertex and vertices connected to that new seed vertex are then identified (s5-5) using the connectivity data for the target model before distance values for those connected vertices are then determined (s5-3). The matching module 34 then again determines (s5-4) whether any of the connected vertices are closer in space to the vertex in the generated model currently being processed than the current seed vertex.

In this way the matching module 34 undertakes a walk over the surface of target model starting at a position selected using the nearest vertex array 36 and moving at each iteration towards vertices in the target model which are even closer to the position of vertex in the generated surface currently being processed.

Eventually, when processing connected vertices, the matching module 36 will determine (s5-4) that none of the vertices connected to the current seed vertex is closer in space to the position of the vertex in the generated model being processed than the seed vertex itself. At that point (s5-6) the matching module 34 identifies which of the triangle planes containing the seed vertex is closest to the vertex in the generated model being processed.

More specifically, having determined the closest vertex in the target model, the matching module 34 uses the connectivity data for the target model surface to identify all triangles in the target model which include that vertex. A point to plane distance is then calculated for the distance between the position of the vertex in the generated model currently being processed and each of the planes containing each of the identified triangles. Data is then stored identifying the closest point to plane distance and the triangle in the target model contained in the plane associated with that distance.

Thus at this stage, the matching module 34 will have identified the plane containing the triangle in the target model which is closest to the vertex being processed. If the current model and the target model correspond to the same surface it is likely that the vertex in question will correspond to a point somewhere within that triangle or somewhere nearby on the surface.

Returning to FIG. 2, having determined the nearest triangle in the target model to the positions of each vertices in the generated model which are currently being utilized for matching, the matching module then (s2-3) proceeds to determine a set of thresholds for selecting vertices to be utilized for determining a matching transformation.

In this embodiment, the matching module 34 utilizes three criteria for filtering.

Firstly the vertices are filtered to remove any matches where the point to plane distance exceeds a threshold. Initially, this threshold is set to a high value such as a distance corresponding to a meter so as only to eliminate outliers and erroneous data points. At subsequent iterations, a threshold is set based on the average point to plane distance from the previous iteration. In order to balance flexibility with a need to reduce a data set to a manageable size, it has been found that setting the distance threshold at one and a half times the average determined point to plane distance is acceptable. Such filtering enables outlier data points to be eliminated and therefore prevents such outliers from affecting a match between a current and a model surface.

In addition to filtering based on a point to plane, distance vertices may also be filtered using an orientation measure. An orientation vector for a vertex in the currently generated model can be determined by calculating the average normal vector of triangles in the currently generated model containing that vertex. The relative orientation of the two models can then be determined by calculating the cross product of the normal to the plane containing the identified closest triangle in the target model and the average normal vector calculated for the vertex being processed. Such a dot product will range from −1 to 1 where −1 indicates that the two surfaces at their closest points are oriented in opposite directions and a value of 1 indicates complete correspondence of orientation. As with a distance measure the determined dot product can be compared with a threshold which initially may be set not to eliminate any vertices and which is progressively increased to require increased similarity in orientation. This progressive approach maximizes the likelihood that matched portions of a model correspond with one another as it would be expected that if points match the orientation at the surface will also match.

Finally in addition to eliminating vertices for consideration based on distance and orientation measures, in this embodiment, the matching module 34 also checks to see if for any two vertices the projection of a vertex on to an identified triangle plane identifies the same location and if this is the case, such vertices are removed from further consideration.

Elimination of such duplicates ensures that a unique transformation to minimize point to plane distances can be determined.

Having determined the distance and orientation thresholds to be utilized for the current iteration, the matching module 34 then proceeds (s2-4) to identify the set of vertices which fulfill the current matching criteria. That is to say the matching module 34 identifies the set of vertices which are associated with point to plane distances less than the current distance threshold and which are associated with orientation measures no greater than the current orientation threshold and identify unique closest vertices in the stored model.

Having filtered the vertices based on distance, orientation and ensuring that each vertex is associated with a unique projection to a triangle plane, the matching module 34 then proceeds (s2-5) to determine a translation and rotation of the current model which minimizes the point to plane distances between vertices in the current model and identified closest triangle planes in the target model.

A suitable translation can be determined by considering the translation required to align the centroid of the vertices in the current model currently being used to match the surfaces with the centroid of a set of points corresponding to the projection of each of those points to the respective closest triangle planes determined for those points. Having determined a suitable translation, a rotation for matching the two surfaces can then be determined by applying Procrustes analysis using as a measure of goodness of match a measure which seeks to minimize the sum of the squares of the point to plane distance measures associated with the vertices being matched.

Having determined the translation and rotation, the matching module 34 then determines (s2-6) whether the required number of iterations have been performed. If this is not the case the matching module 34 applies (s2-7) the determined translation and rotation to the vertex data for the currently generated model being matched. The nearest triangle planes in the target model to each of the vertices in the current model being utilised to match the current model to the target model are then determined (s2-2) before being filtered (s2-3-s2-4) and utilized to determine (s2-5) a translation and rotation for an improved match.

When the matching module 34 determines (s2-6) that the final iteration has been reached, then the matching module 34 then outputs (s2-8) as a calculated final transformation the sum of the translations and rotations determined for matching the generated surface to the model surface. The determined transformation can then either be used to cause the mechanical couch 18 to re-orientate the patient or alternative to trigger a warning or halt treatment where a patient is detected as being out of position by more than an acceptable amount.

The determination of a matching transformation in the manner described has been determined to be able to generate a more accurate match than simply attempting to undertake Procrustes analysis to match a current and a target model based on attempting minimize the least squares distances for vertices in a pair of models. When generating models of the surface of a patient from stereoscopic images obtained at different times, the vertices in models only correspond to points on the surface and not necessarily the same points on the surface of the patient. Rather than trying to determine a match between vertices in a model, the described system determines a match which facilitates the matching of vertices to any position identified as being on a target model surface including all of the surface represented by triangles.

The described approach also enables such matches to be determined rapidly. Pre-populating a nearest vertex array 36 enables initial seed points for determining matches to be determined very quickly. Undertaking a walk on the surface of a model to check whether nearby vertices in a target model are in fact closer to a vertex than an initially identified seed point removes errors which might occur because of any approximations used when selecting the initial seed point. The speed of matching can be further increased by only considering a subset of vertices for matching at each iteration. As described a suitable subset which retains vertices which are most likely to correspond to the area of overlap between two models can be determined by considering the relative orientation and plane to point distance measures at points being matched. By gradually increasing the threshold for continued use of a vertex only those points determined as being most suitable for matching are retained.

FURTHER ALTERNATIVES AND EMBODIMENTS

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier could be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A computer implemented method of determining a rigid transformation for matching a position of an object with a position of a target object represented by a target model comprising data identifying 3D positions of a set of vertices of a triangulated 3D wire mesh and connectivity indicative of connections between vertices, the method comprising:
   obtaining stereoscopic images of an object;
   processing the stereoscopic images utilizing a computer to identify 3D positions of a plurality of points on a surface of the imaged object;
   generating an array identifying, for a regular grid of points in 3D space, the vertices of the target model closest to those grid points by:
   for each vertex in the target model, using 3D co-ordinates associated with the vertex of the target model to identify grid points of the regular 3D grid corresponding to corners of a cube that contains the location of the vertex, determining a distance between the vertex and the positions corresponding to the identified grid points, and determining whether said identified grid points are associated with data indicative of the grid points being closer to another vertex in the target model and if not associating said grid points with data identifying the vertex and the distance between the vertex and said grid points; and traversing the regular 3D grid in each of the directions corresponding to the axes of the regular 3D grid and determining when traversing the regular 3D grid, whether a vertex associated with a neighboring grid point on the regular 3D grid in a direction of traversal is closer to the position associated with a current grid point than any vertex previously associated with that grid point and if so associating the grid point with data identifying the vertex associated with the neighboring grid point;

identifying, for each point on the surface of the imaged object, grid points of the regular 3D grid corresponding to the corners of a cube that contains the point on the surface of the imaged object;

utilizing the vertices associated with the identified grid points by the array to identify triangles in the target model surface closest to each of said points on the surface of the imaged object;

utilizing the computer to select a set of the identified 3D positions on the surface of the imaged object as points to be utilized to determine a rigid transformation for matching the position of the object with the position of the target object on the basis of the determined distances between the identified 3D positions and vertices of the target model identified as being closest to said positions; and utilizing the computer to calculate a rigid transformation which minimizes point to plane distances between the identified set of 3D positions and the planes containing the triangles of the target model surface identified as being closest to said positions.

2. The computer implemented method of claim 1, wherein selecting a set of the identified 3D positions on the surface of the imaged object and calculating a rigid transformation which minimizes point to plane distances between the identified set of 3D positions and the planes containing the triangles of the target model surface identified as being closest to those positions comprises for a number of iterations:

determining threshold values to be utilized for a current iteration;

selecting a set of the identified 3D positions on the surface of the imaged object as points to be utilized to determine a rigid transformation for matching the position of the object with the position of the target object on the basis of a comparison of the distances between the identified 3D positions and vertices of the target model identified as being closest to said positions with a threshold value;

calculating a rigid transformation which minimizes point to plane distances between the identified set of 3D positions and the planes containing the triangles of the target model surface identified as being closest to those positions;

wherein the rigid transformation for matching the position of the object with the position of the target object comprises a sum of the transformations determined at each iteration.

3. The computer implemented method of claim 2, wherein: determining threshold values to be utilized for a current iteration comprises:

setting an initial threshold value for a first iteration; and determining a threshold value for use in a subsequent iteration on a basis of average distances between the identified 3D positions and vertices of the target model identified as being closest to said positions.

4. The computer implemented method of claim 1, wherein selecting a set of the identified 3D positions on the surface of the imaged object as points to be utilized to determine a rigid transformation for matching the position of the object with the position of the target object further comprises:

filtering the selected set of identified 3D positions on the surface of the imaged object to be utilized to calculate a rigid transformation on a basis of a relative orientation of the object at a point and an orientation of a triangle in the target model surface identified as being closest to that point, wherein the orientation of the object at the point is determined by generating a model of the object and calculating an average normal vector of triangles in the generated model that contain the point.

5. The computer implemented method of claim 1, wherein selecting a set of the identified 3D positions on the surface of the imaged object as points to be utilized to determine a rigid transformation for matching the position of the object with the position of the target object further comprises:

filtering the selected set of identified 3D positions on the surface of the imaged object to be utilized to calculate a rigid transformation to remove any points determined to project to a same location prior to calculating a rigid transformation which minimizes point to plane distances between the filtered identified set of 3D positions and the planes containing the triangles of the target model surface identified as being closest to those points.

6. The computer implemented method of claim 1, wherein calculating a rigid transformation which minimizes point to plane distances between the identified set of 3D positions on the surface of the imaged object and the planes containing the triangles of the target model surface identified as being closest to those positions comprises:

determining for each of said positions, projections of said positions to the planes containing the triangles of the target model surface identified as being closest to those positions;

determining a translation which aligns a centroid of the positions identified as being locations on the surface of the object with a centroid of projections of said positions to identified planes containing the triangles of the target model surface identified as being closest to those positions; and determining a rotation which minimizes point to plane distances between the identified set of 3D positions on the surface of the imaged object and the planes containing the triangles of the target model surface identified as being closest to those positions after the determined translation has been applied.

7. The computer implemented method of claim 1, wherein utilizing the vertices associated with the identified grid points of the regular 3D grid by the array to identify the triangle in the target model surface closest to a point comprises:

determining of the vertices associated with the identified grid points of the regular 3D grid, the vertex of the target model surface closest to the point on the surface of the imaged object currently being processed;

determining if any of the vertices directly connected to the determined closest vertex is closer to the 3D position of the point on the surface of the imaged object currently being processed;

if any of the directly connected vertices is determined to be closer to the 3D position of the point on the surface of the imaged object currently being processed, identifying whether any vertices connected to that vertex is closer to the 3D position of the point on the surface of the imaged object currently being processed; and when it is determined that none of the directly connected vertices is determined to be closer to the 3D position of the point on the surface of the imaged object currently being processed, determining for each triangle in the target model surface containing the closest identified vertex, the distance between a plane containing the triangle and the 3D position of the point on the surface of the imaged object to identify the triangle in the target model surface closest to the point on the surface of the imaged object currently being processed.

8. A patient monitoring system comprising:

a 3D position determination module configured to process stereoscopic images of a patient to identify 3D positions of a plurality of points on a surface of an imaged patient;

a target model store configured to store a target model comprising data identifying 3D positions of a set of vertices of a triangulated 3D wire mesh model and connectivity indicative of connections between vertices;

a matching module configured to identify the triangles in a target model surface stored in the target model store closest to points identified by the 3D position determination module and calculate a rigid transformation which minimizes point to plane distances between a selected set of the identified points and the planes containing the triangles of the target model surface identified as being closest to those points wherein the selected set of the identified points utilized to determine the rigid transformation is selected on a basis of the determined distances between the identified 3D positions and vertices of the target model identified as being closest to said positions; and a nearest vertex array configured to store data identifying, for points on a regular grid, the vertices of the target model stored in the target model store closest to said grid points, wherein the matching module is configured to generate data identifying, for a regular grid of points in 3D space, the vertices of the target model closest to those grid points by:

for each vertex in a target model, using 3D co-ordinates associated with the vertex of the target model to identify grid points of the regular 3D grid corresponding to corners of a cube that contains the location of the vertex, determining a distance between the vertex and the positions corresponding to the identified grid points; and determining whether said identified grid points are associated with data indicative of the grid points being closer to another vertex in the target model and if not associating said grid points with data identifying the vertex and the distance between the vertex and said gird points; and traversing the regular 3D grid in each of the directions corresponding to the axes of the regular 3D grid and determining when traversing the regular 3D grid, whether a vertex associated with a neighbouring grid point on the regular 3D grid in a direction of traversal by data in the nearest vertex array is closer to the position associated with a current grid point than any vertex previously associated with that grid point and if so associating the grid point in the nearest vertex array with data identifying the vertex associated with the neighbouring grid point wherein the matching module is configured to identify the triangles in the target model surface stored in the target model store closest to points identified by the 3D position determination module by:

identifying, for each point on the surface of the imaged patient, grid points of the regular 3D grid corresponding to the corners of a cube that contains the point on the surface of the imaged patient; and utilizing the vertices associated with the identified grid points by the nearest vertex array to identify the triangles in the target model surface closest to each of said points on the surface of the imaged patient.

9. The patient monitoring system of claim 8, wherein the matching module is configured to select identified 3D positions on the surface of the imaged patient to be utilized to calculate a rigid transformation by:

determining a distance between a point and a vertex of the target model identified as being closest to the point; and selecting as points to be utilized to calculate a rigid transformation, points associated with a distance which is less than a threshold.

10. The patient monitoring system of claim 9, wherein the threshold comprises a threshold determined on a basis of an average determined distance between the identified 3D positions and identified closest vertices in the target model.

11. The patient monitoring system of claim 8, wherein the matching module is configured to filter the selected set of identified 3D positions on the surface of the imaged patient to be utilized to calculate a rigid transformation which minimizes point to plane distances on a basis of a relative orientation of the patient at a point and an orientation of a triangle in the target model surface identified as being closest to that point, wherein the orientation of the patient at the point is determined by generating a model of the patient and calculating an average normal vector of triangles in the generated model that contain the point.

12. The patient monitoring system of claim 8, wherein the matching module is configured to filter the selected set of identified 3D positions on the surface of the imaged patient to be utilized to calculate a rigid transformation which minimizes point to plane distances to remove any points determined to project to a same location prior to calculating a rigid transformation which minimizes point to plane distances between the filtered identified set of 3D positions and the planes containing the triangles of the target model surface identified as being closest to those points.

13. The patient monitoring system of claim 8, wherein the matching module is configured to calculate a rigid transformation which minimizes point to plane distances by:

determining for points, the projections of said points to the planes containing the triangles of the target model surface identified as being closest to those points;

determining a translation which aligns a centroid of the points identified as being locations on the surface of the patient with a centroid of projections of said points to identified planes containing the triangles of the target model surface identified as being closest to those points; and determining a rotation which minimizes point to plane distances between the identified points on the surface of the imaged patient and the planes containing the triangles of the target model surface identified as being closest to those points after the determined translation has been applied.

14. The patient monitoring system of claim 8, wherein the matching module is configured to utilize the vertices associated with the identified grid points of the 3D grid by the nearest array vertex to identify the triangle in a target model surface closest to a point by:

determining of the vertices associated with the identified grid points of the regular 3D grid by data in the nearest vertex array, the vertex of the target model surface closest to the point on the surface of the imaged patient currently being processed;

determining if any of the vertices directly connected to the determined closest vertex is closer to the 3D position of the point on the surface of the imaged patient currently being processed;

if any of the directly connected vertices is determined to be closer to the 3D position of the point on the surface of the imaged patient currently being processed, identifying whether any vertices connected to that vertex is closer to the 3D position of the point on the surface of the imaged patient currently being processed; and when it is determined that none of the directly connected vertices is determined to be closer to the 3D position of the point on the surface of the imaged patient currently being processed, determining for each triangle in the target model surface containing the closest identified vertex, the distance between a plane containing the triangle and the 3D position of the point on the surface of the imaged patient to identify the triangle in the target model surface closest to the point on the surface of the imaged patient currently being processed.

15. The patient monitoring system of claim 8, further comprising:
a stereoscopic camera configured to obtain stereoscopic images of the patient, wherein the 3D position determination module is arranged to process stereoscopic images obtained by the stereoscopic camera.

16. The patient monitoring system of claim 15, further comprising:
a mechanical couch, wherein the stereoscopic camera is configured to obtain stereoscopic images of the patient on the mechanical couch and the matching module is configured to generate instructions to cause the mechanical couch to align the imaged patient on a basis of a calculated rigid transformation which minimizes point to plane distances between the identified points on the surface of the imaged patient and the planes containing the triangles of the target model surface identified as being closest to those points.

17. The patient monitoring system in accordance of claim 8, further comprising a treatment apparatus, wherein the treatment apparatus is arranged to be inhibited from operating if the matching module determines that a calculated rigid transformation which minimizes point to plane distances between the identified points on the surface of the imaged patient and the planes containing the triangles of the target model surface identified as being closest to those points is indicative of the patient being out of position by more than a threshold amount.

18. A non-transitory computer readable medium storing computer instructions which when executed by a programmable computer cause the programmable computer to perform a method of:
determining a rigid transformation for matching a position of an object with a position of a target object represented by a target model comprising data identifying 3D positions of a set of vertices of a triangulated 3D wire mesh and connectivity indicative of connections between vertices, the method comprising:
obtaining stereoscopic images of an object;
processing the stereoscopic images to identify 3D positions of a plurality of points on a surface of the imaged object;
generating an array identifying, for a regular grid of points in 3D space, the vertices of the target model closest to those grid points by:
for each vertex in the target model, using 3D co-ordinates associated with the vertex of the target model to identify grid points of the regular 3D grid corresponding to corners of a cube that contains the location of the vertex, determining a distance between the vertex and the positions corresponding to the identified grid points, and determining whether said identified grid points are associated with data indicative of the grid points being closer to another vertex in the target model and if not associating said grid points with data identifying the vertex and the distance between the vertex and said grid points; and
traversing the regular 3D grid in each of the directions corresponding to the axes of the regular 3D grid and determining when traversing the regular 3D grid, whether a vertex associated with a neighboring grid point on the regular 3D grid in a direction of traversal is closer to the position associated with a current grid point than any vertex previously associated with that grid point and if so associating the grid point with data identifying the vertex associated with the neighboring grid point;
identifying, for each point on the surface of the imaged object, grid points of the regular 3D grid corresponding to the corners of a cube that contains the point on the surface of the imaged object;
utilizing the vertices associated with the identified grid points by the array to identify triangles in the target model surface closest to each of said points on the surface of the imaged object;
selecting a set of the identified 3D positions on the surface of the imaged object as points to be utilized to determine a rigid transformation for matching the position of the object with the position of the target object on the basis of the determined distances between the identified 3D positions and vertices of the target model identified as being closest to said positions; and
calculating a rigid transformation which minimizes point to plane distances between the identified set of 3D positions and the planes containing the triangles of the target model surface identified as being closest to said positions.

* * * * *